United States Patent [19]

Ross et al.

[11] Patent Number: 5,512,912
[45] Date of Patent: Apr. 30, 1996

[54] MARINE ANTENNA MOUNT

[75] Inventors: David J. Ross, Leesburg; Gary Churan, Annandale; Charles Kittiver, Vienna, all of Va.

[73] Assignee: AMSC Subsidiary Corporation, Reston, Va.

[21] Appl. No.: 187,996

[22] Filed: Jan. 28, 1994

[51] Int. Cl.$^6$ .................................................. H01Q 1/12
[52] U.S. Cl. .......................... 343/765; 343/709; 343/882
[58] Field of Search ..................................... 343/872, 709, 343/765, 757, 713, 882; H01Q 1/12

[56]  References Cited

U.S. PATENT DOCUMENTS

| | | | |
|---|---|---|---|
| 1,569,325 | 1/1926 | Leib | 343/882 |
| 2,893,675 | 7/1959 | Smith et al. | 248/284 |
| 2,926,879 | 3/1960 | Dietrich | 248/284 |
| 3,840,204 | 10/1974 | Thomas et al. | 248/311.2 |
| 3,860,931 | 1/1975 | Pope et al. | 343/709 |
| 3,968,496 | 7/1976 | Brunvoll | 343/765 |
| 4,118,707 | 10/1978 | Yoshida et al. | 343/765 |
| 4,193,308 | 3/1980 | Stuhler et al. | 343/765 |
| 4,582,291 | 4/1986 | Matthews | 343/765 |
| 4,596,989 | 6/1986 | Smith et al. | 343/709 |
| 4,609,083 | 9/1986 | Stuhler | 343/709 |
| 4,725,843 | 2/1988 | Suzuki et al. | 343/709 |
| 5,111,212 | 5/1992 | DeSatnick et al. | 343/709 |

FOREIGN PATENT DOCUMENTS

| | | | |
|---|---|---|---|
| 55-141804 | 11/1980 | Japan | 343/709 |
| 58-54702 | 3/1983 | Japan | 343/709 |
| 890264 | 2/1962 | United Kingdom | 343/765 |
| 2127622 | 4/1984 | United Kingdom | 343/709 |

*Primary Examiner*—Michael C. Wimer
*Attorney, Agent, or Firm*—Lowe, Price, LeBlanc & Becker

[57]  ABSTRACT

An antenna mount for a vehicle includes a two axis gimbaled mounting which allows the antenna to rotate in two axes. A pendular mass is provided to maintain the antenna in a particular orientation in the absence of any externally applied acceleration. A chamber is provided attached to the pendular mass for holding a viscous dampening fluid. The dampening fluid allows the antenna mount to rotate in response to an externally applied acceleration but serves to dampen any oscillations induced by an externally applied acceleration. The antenna mount maintains the antenna in substantially a predetermined position despite the influence of externally applied accelerations. Shock absorbers may be supplied to the gimbal mounting to aid in the dampening of large accelerations.

26 Claims, 13 Drawing Sheets

MARINE ANTENNA MOUNT

TECHNICAL FIELD

The present invention comprises a dampened dual-axis gimbal mount for a radio antenna. The gimbaled mount allows land mobile antennas to be used aboard marine vessels, particularly small craft. The antenna mount of the present invention has particular application for directional antennas such as satellite antennas.

BACKGROUND ART

The need for radio communications for mobile vehicles has greatly increased. In addition to passive radio receivers (e.g., AM/FM receiver or the like), two-way communications devices (e.g., CB, HAM, VHF, Cellular Telephone or the like) have been increasingly used in both land and marine applications. Satellite communications systems have been applied for both navigation (e.g., GPS or the like) and communications (e.g., Satellite telephony). Thus, there is an increasing demand for high performance antenna systems for mobile land and marine use.

Directional and omnidirectional antennas for use in satellite communications are known in the art. One example of such an omnidirectional antenna is disclosed, for example, in co-pending U.S. application Ser. No. 08/058,079 filed on May 10, 1993 entitled "MSAT MAST ANTENNA WITH REDUCED FREQUENCY SCANNING". Other types of directional antennas are also known in the art, including but not limited to parabolic dish antennas, capacitive array antennas, and other types of mechanically or electrically steered directional satellite antennas.

Such antennas may be used with a high degree of reliability for mobile land use for vehicles such as automobiles, trucks, or the like. In mobile land use applications, a relatively omnidirectional antenna may be used to compensate for vehicle movement. Alternately, vehicle movement may be compensated for by providing active or passive antenna positioning techniques.

An example of one such active antenna positioning device using a parabolic dish design is shown in Suzuki et al. U.S. Pat. No. 4,725,843, issued Feb. 16, 1988, shown in FIG. 3. FIG. 3 shows a vehicle 3 with parabolic dish antenna 1 and feed horn 2. As can be readily ascertained from FIG. 3, the relatively large dish antenna 1 precludes the use of any rooftop accessories (e.g., roof rack or the like) and presents quite a profile to the wind. In addition, such a design is somewhat aesthetically displeasing, thus precluding mass consumer acceptance. Mobile satellite communications systems have consumer applications and as such, a pleasing aesthetic design is a necessary criteria. The parabolic dish 1 of FIG. 3 includes a positioning mechanism to constantly reposition dish 1 as vehicle 3 travels. While such a positioning system may adequately compensate for the relatively slow direction changes experienced in an automobile, such a system may not be able to adequately compensate for the sudden and rapid movements of a marine vehicle, such as a small craft. Such a positioning system may also be relatively complex and fragile, and as such, constant repositioning may quickly reduce the service life of motors, gears, and the like.

For marine applications, the parabolic dish of Suzuki has particular disadvantages. As discussed above, the dish presents a large profile to the wind and thus would be susceptible to wind loading. For small craft use (e.g., boats under 50' in length) the additional wind loading due to the satellite dish may be entirely unacceptable. In addition, although such a dish may be applied to a large marine vessel (e.g., ocean liner, oil tanker, freighter, or the like) having a relatively stable or slowly oscillating motion characteristic, such an antenna could not readily be applied to small craft where rapid oscillations and changes in direction take place and may not suitably compensated for by active positioning techniques.

Various types of passive gimbaled mounts have been tried for marine applications. An example of such a gimbaled mount is shown, for example, in Akiyama published Japanese patent application 55-141804, published Nov. 6, 1980 and shown in FIG. 4. Akiyama uses a mount 9 having gimbaled supports 6 and 7 and a counterweight 4 to maintain position of an antenna 1 to compensate for the pitching and rolling of a ship. While such a design may be suitable for large ocean going vessels, the design presents a relatively large profile and thus increased wind loading. In addition, the pendulum design of Akiyama, while suitable for compensating for gentle pitching and rolling, may be unsuitable for the sudden and rapid oscillations which occur in small craft. In particular, such a pendulum, once placed in motion, will tend to oscillate due to its inherent inertia.

Other antenna mounting devices have been tried incorporating dampening features to dampen unwanted pendulum effects. One such device, Elston published UK patent application 2,127,622, published Apr. 11, 1984 is shown in FIG. 5. Elston shows an antenna mount having a bob weight 25 and a counterweight 29 containing a series of compartments filled with a fluid medium such as water or mercury. A sensor detects complex motions of the pendulum system and uses a motor to drive bob weight 25 up or down. In an alternative embodiment, a second pendulum 30 is provided to change the center of gravity of the device and compensate for the actions of bob weight 25. While such a system may be suitable for a large ocean going vessel, the size and complexity of such a device, as well as the cost, may make it unsuitable for small craft applications.

FIG. 6 shows a radar antenna mount disclosed in DeSatnick et al. U.S. Pat. No. 5,111,212, issued May 5, 1992. DeSatnick et al. provides an antenna mount for a sailboat which provides single axis rotation to compensate for heeling of the sailboat. DeSatnick et al. prevents unwanted pendular oscillations by providing a viscous damping fluid within the rotary mount. A series of vanes are provided in the dampening fluid such that, as the shaft rotates the viscus fluid passes between regions of the vanes and dampens the rotational movement. Although the device of DeSatnick et al. may be applied to small craft such as sailboats, the apparatus provides motion compensation in one direction only. For directional satellite antenna use, compensation must be provided for all axes. In addition, in powerboat applications, sudden and rapid changes in direction and wave induced oscillations may occur. Thus, the device of DeSatnick et al., which designed to compensate for the gentle heeling of a sailboat, may be inappropriate for satellite communications in power boat or other small craft applications.

In addition, the DeSatnick devices uses viscous fluid in much the same manner as a shock absorber, to dampen motion by metering the fluid between vanes through an orifice or port (See, e.g., Col. 3, lines 35–49). Such an arrangement serves not only to dampen oscillation, but also to dampen any rapid response to sudden shocks or accelerations. Thus, the apparatus may be unsuitable for small craft operation. In addition, the DeSatnick device requires a shaft opening with an appropriate seal in order to transfer the motion of the antenna to the vanes in the viscous fluid. In a harsh marine environment, such seals may be exposed to severe conditions, and thus presents an additional maintenance item and potential leakage condition.

Thus, it remains a requirement in the art to provide an antenna mount, particularly for small craft marine applications, which can compensate for sudden and rapid changes in vehicle direction as well as rapid oscillations while presenting a small profile for wind loading.

DISCLOSURE OF THE INVENTION

The antenna mount of the present invention comprises an antenna mounting plate for coupling the antenna mount to an antenna, a two-axis gimbal, mounted on a vehicle and the antenna mounting plate and allowing the antenna mounting plate to rotate in two axes. A ballast is provided, coupled to the antenna mounting plate, for orienting the antenna in a predetermined position in the absence of any externally applied acceleration. A dampening chamber is attached to the antenna mounting plate and allows rotation of the antenna mounting plate in any of two axes in response to an externally applied acceleration, while dampening oscillations induced by said externally applied acceleration.

It is therefore an object of the present invention to provide an antenna mount for a vehicle which maintains an antenna in a predetermined orientation in the absence of any externally applied acceleration.

It is a further object of the present invention to provide an antenna mount for a vehicle which allows an antenna to rotate in two axes so as to maintain an antenna in a predetermined orientation in response to an externally applied acceleration.

It is a further object of the present invention to provide an antenna mount which dampens oscillations induced by externally applied accelerations.

It is a further object of the present invention to provide an antenna mount which is not susceptible to wind loading.

It is a further object of the present invention to provide an antenna mount which provides a compact and aesthetically pleasing appearance.

It is a further object of the present invention to provide an antenna mount which is economical to produce and inexpensive to maintain.

BEST MODE FOR CARRYING OUT THE INVENTION

Figure 1A:
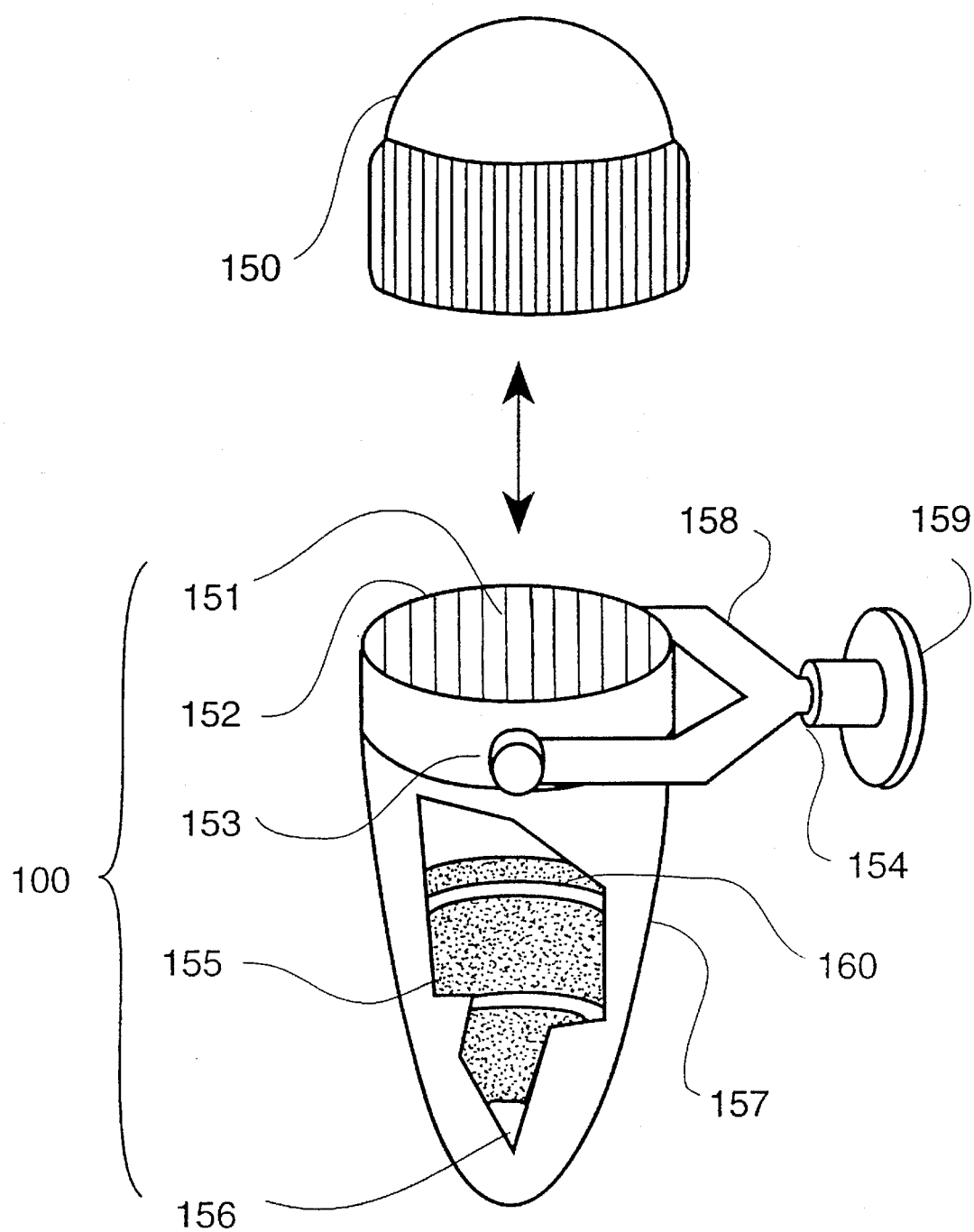
FIG. 1A is an exploded and broken perspective view of the marine antenna mount of the present invention.

FIG. 1A is an exploded and cut away perspective view of the marine antenna mount of the present invention. Radome 150 is shown in exploded view from ballast assembly 100. Radome 150 may house a satellite or other type antenna which does not form part of the present invention. Mounting plate 152 on ballast assembly 100 is provided with female threaded portion 151 for receiving Radome 150. Female threaded portion 151 may comprise, for example, a 5/16–5/18 threaded hole.

Mounting plate 152 is attached to housing 157 of ballast assembly 100 which is mounted to yoke 158 via pitch gimbal 153. Mounting yoke 158 is attached to mounting bracket 159 via roll gimbal 154. Housing 157 contains weight 156 located at the bottom of housing 157. In the preferred embodiment, weight 156 comprises a lead weight, although other types of materials may be used which provide suitable mass. Within housing 157 lies dampening fluid 155, which may comprise a viscous fluid such as glycol.

The dampening characteristics of dampening fluid 155 are carefully chosen to provide the correct dampening for the antenna mount of FIG. 1A. In addition, dampening fluid 155 is selected to provide a fluid which has appropriate freeze temperature characteristics so that dampening fluid 155 will not solidify in normal use. Further, dampening fluid 155 is selected such that the fluid has a relatively constant viscosity characteristics with respect to temperature. In the preferred embodiment, dampening fluid 155 comprises glycol.

Figure 14:
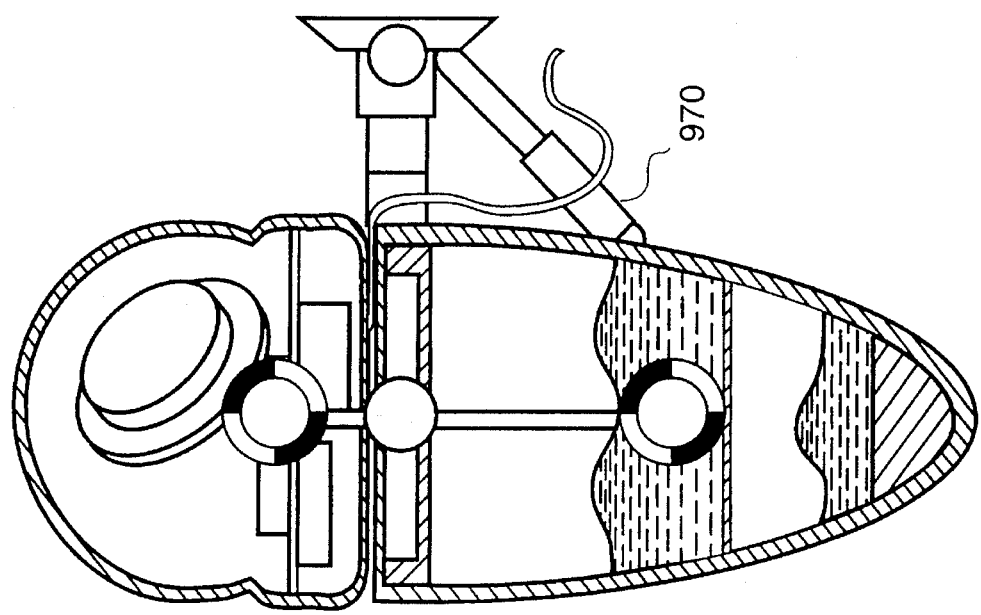
FIG. 14 is a cross-section view of a preferred mode of the embodiment of FIG. 9A.
Figure 13:
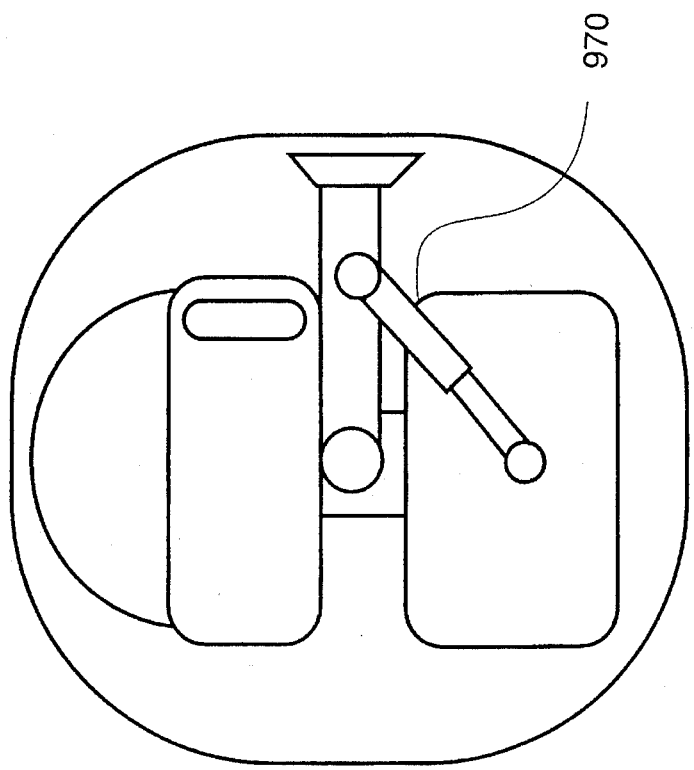
FIG. 13 is a plan view of a fourth embodiment of the present invention.

In an alternative embodiment, pitch gimbal 153 and/or roll gimbal 154 may be provided with additional shock absorption devices. These devices may take the form of pneumatic or hydraulic dampeners or friction disks inserted in gimbal joint 153, 154 to dampen movement. In the preferred embodiment, a pneumatic dampener, such as an Air-Pot™ may be used at the rotational joints of gimbals 153, 154. Alternately, hydraulic or pneumatic dampeners 970 may be externally mounted, for example, as shown in FIGS. 13 and 14. Friction disks may be inserted in gimbal joints 153, 154 with tension maintained on the disks by means of a spring mechanism (e.g., belleville washers or the like) so as to provide a predetermined friction within gimbal joint 153, 154. Alternately, other types of mechanical or hydromechanical dampening units known in the art may be applied to gimbal joints 153, 154. These shock absorption devices may be supplied to supplement dampening fluid 155 to aid in the dampening of large accelerations. During large accelerations, the dampening fluid 155 may tend to remain at the bottom portion of antenna mount 100 due to centripetal acceleration. The use of external shock absorbers 970 delays the motion of antenna mount 100, causing displacement of dampening fluid 155 so as to establish the free-surface effect described below. Alternately, these additional shock absorption devices may serve to eliminate or substantially reduce movement of the antenna mount due to minor shocks or vibrations.

Figure 1B:
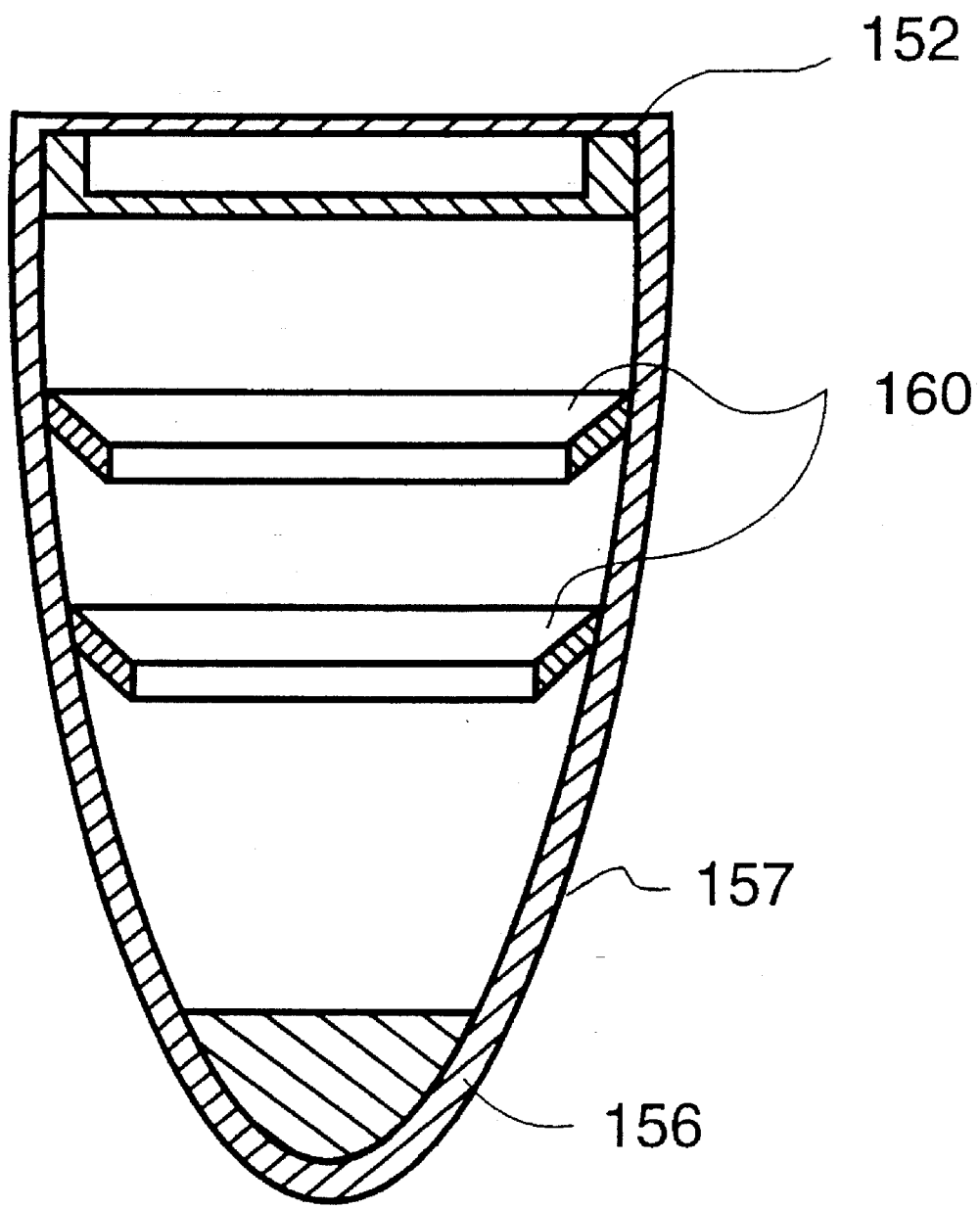
FIG. 1B is a cross-section view of the ballast tank of the marine antenna mount of FIG. 1A, showing one alternative embodiment.

Housing 157 may be provided with a series of annular rings 160 which are shown in cross-section in FIG. 1B. Annular rings 160 are provided to alter the dampening action of dampening fluid 155 by providing additional surface area to housing 157 to interact with dampening fluid 155.

For the sake of illustration, the antenna lead cable is not shown in FIG. 1A. A suitable length of flexible lead cable, with a drop loop, for example, may be provided to connect the antenna to shipboard communications equipment. Alternately, a coiled, flexible cable may also be used. In addition, the antenna unit may be self-contained, for example, for use as a self-powered emergency beacon. Finally, as would be readily apparent to one of ordinary skill in the art, contact brushes may be used at the gimbals in order to provide suitable electrical connections for the antenna. Any suitable technique may be used such that the antenna lead does not interfere with the movement of the antenna mount or act to alter the dampening of the system.

Figure 2:
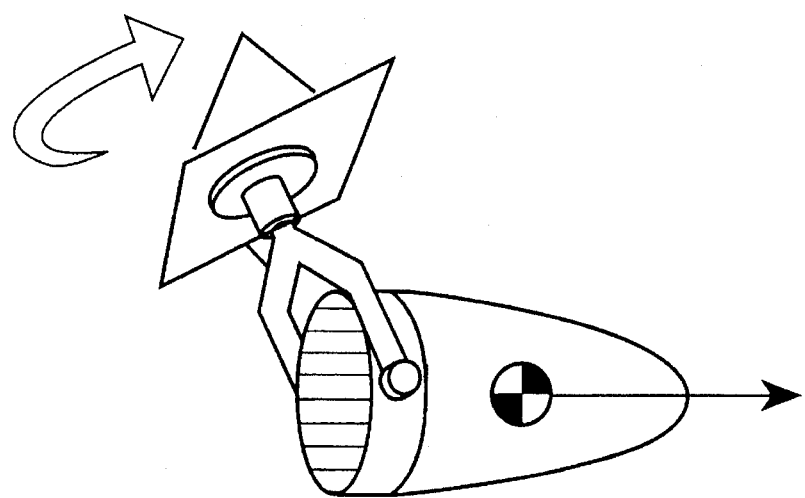
FIG. 2A is a perspective view of the antenna mount of the present invention, showing the action of the center of gravity.
FIG. 2B is a perspective view of the antenna mount of the present invention showing the action of vehicle motion in one axis.
FIG. 2C is a perspective view of the antenna mount of the present invention showing the action of vehicle motion in another axis.
Figure 2:
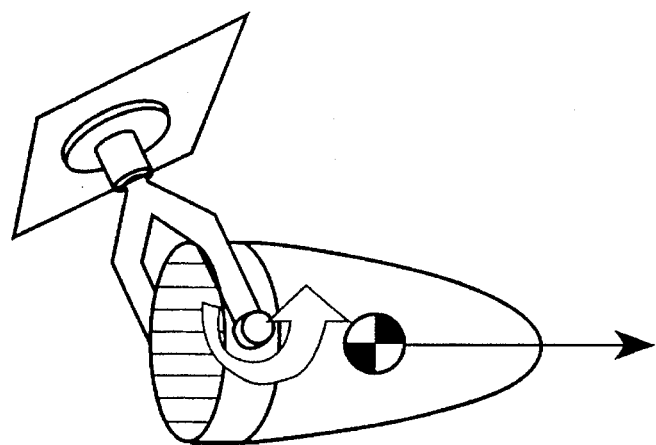
Figure 2:
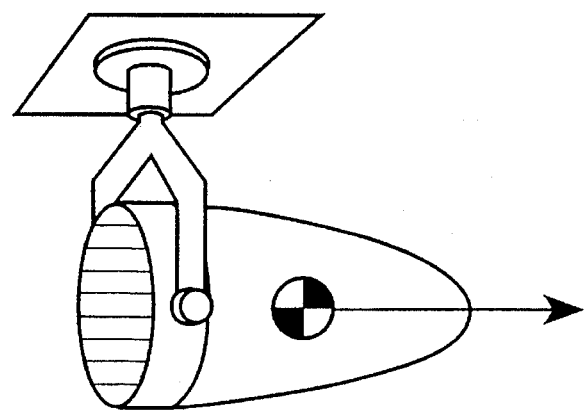
Figure 3:
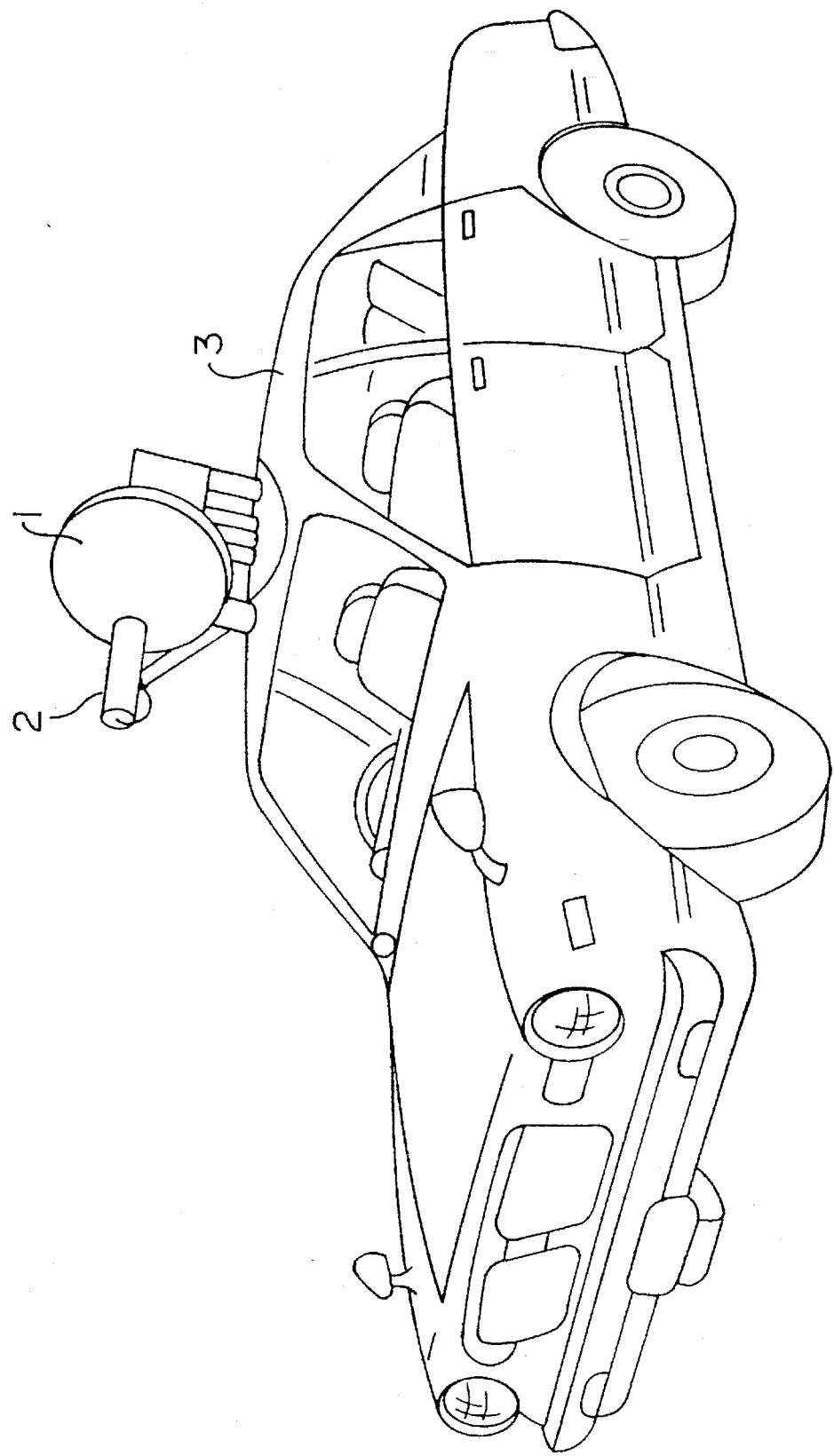
FIG. 3 shows a prior art antenna mount for a motor vehicle.
Figure 4:
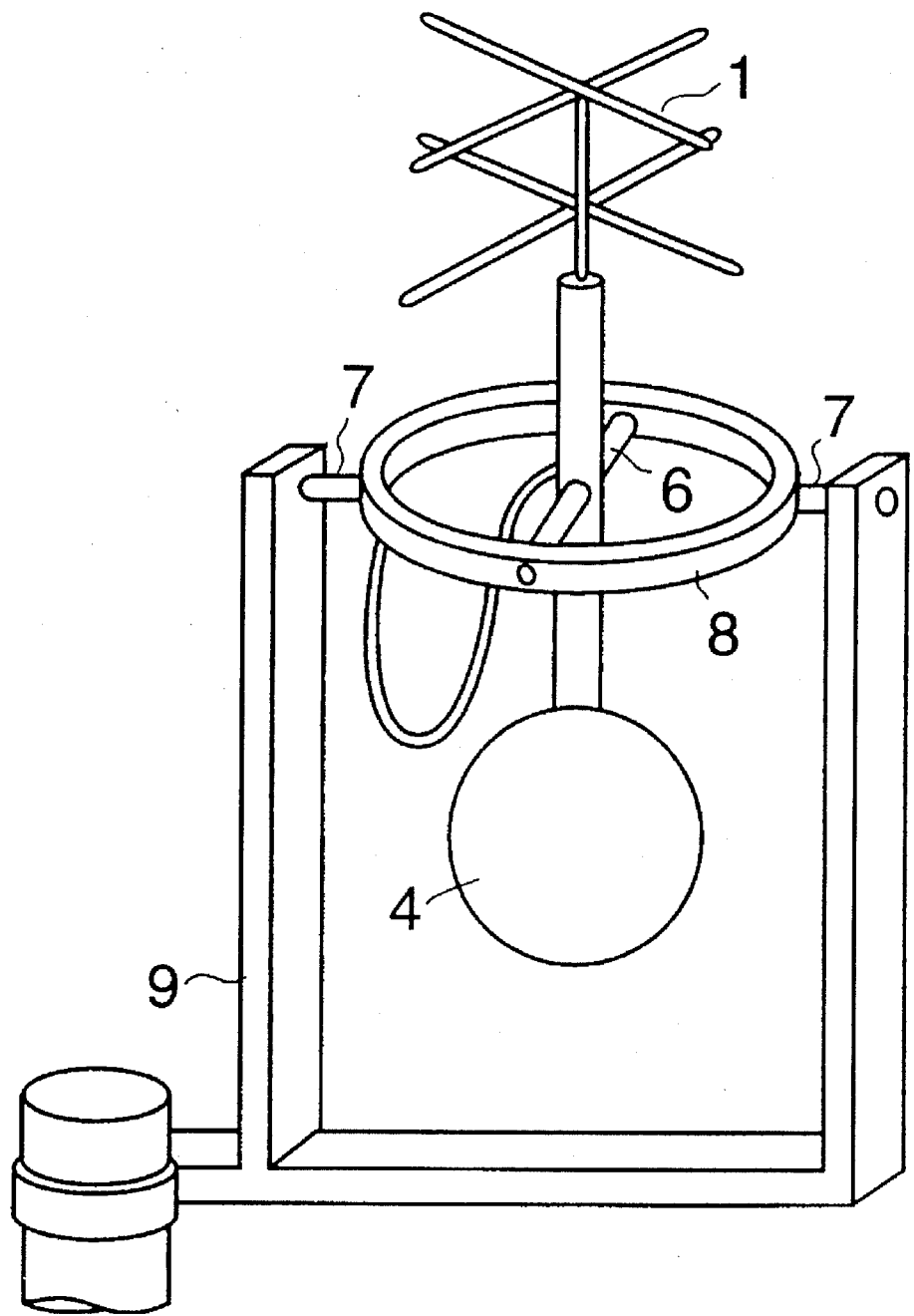
FIG. 4 shows a prior art pendular antenna mount for a ship.
Figure 5:
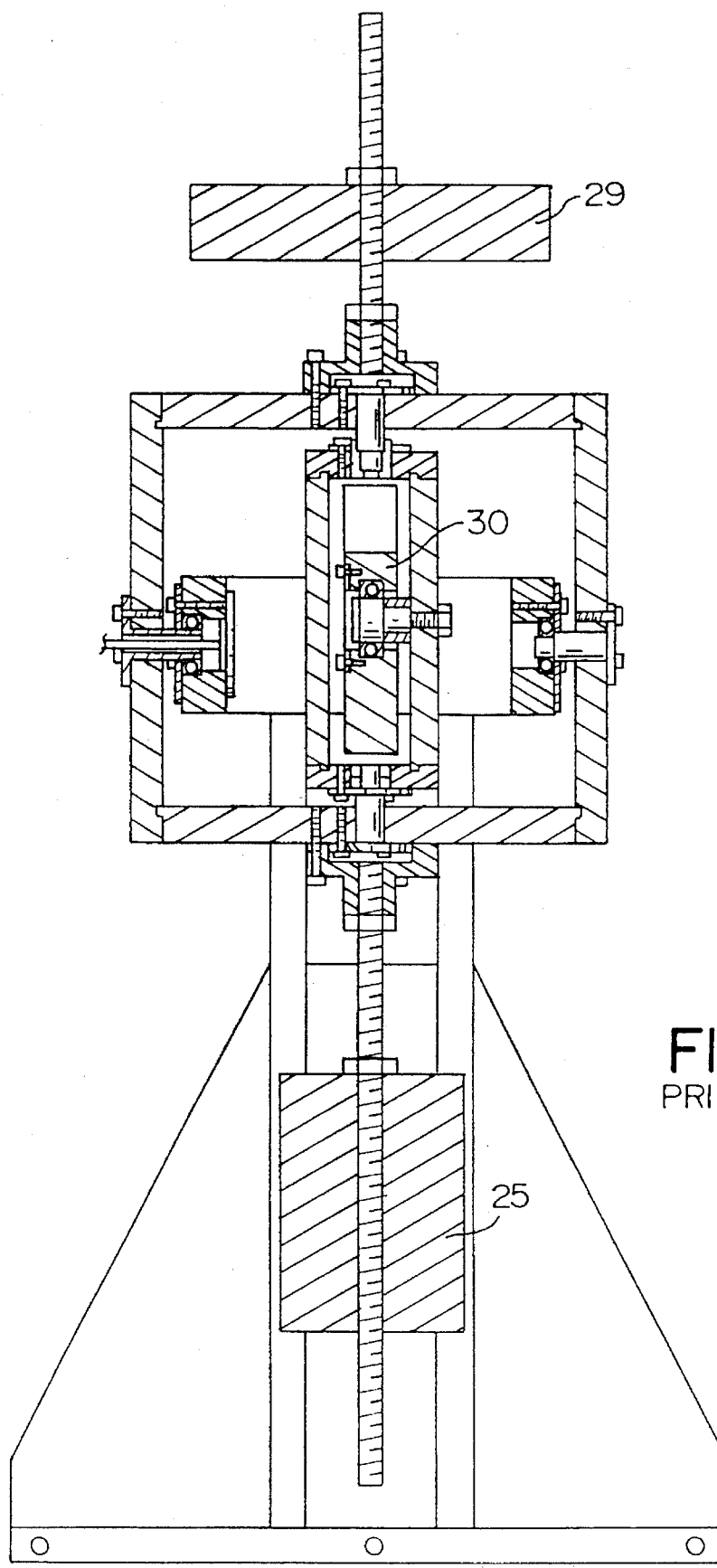
FIG. 5 shows a prior art pendular antenna mount for a ship, with an active dampening system.

FIGS. 2A–C show how the pendular action of the antenna mount of the present invention allows the mount to maintain the antenna in a relatively stable position. FIG. 2A shows the antenna mount of the present invention in a nominal position, showing the center of gravity. Since the center of gravity lies beneath the pivot point, The antenna mount tends to maintain its position during rotation in both the x-axis, as shown in FIG. 2B, or the y- and z-axis, as shown in FIG. 2C.

Figure 7:
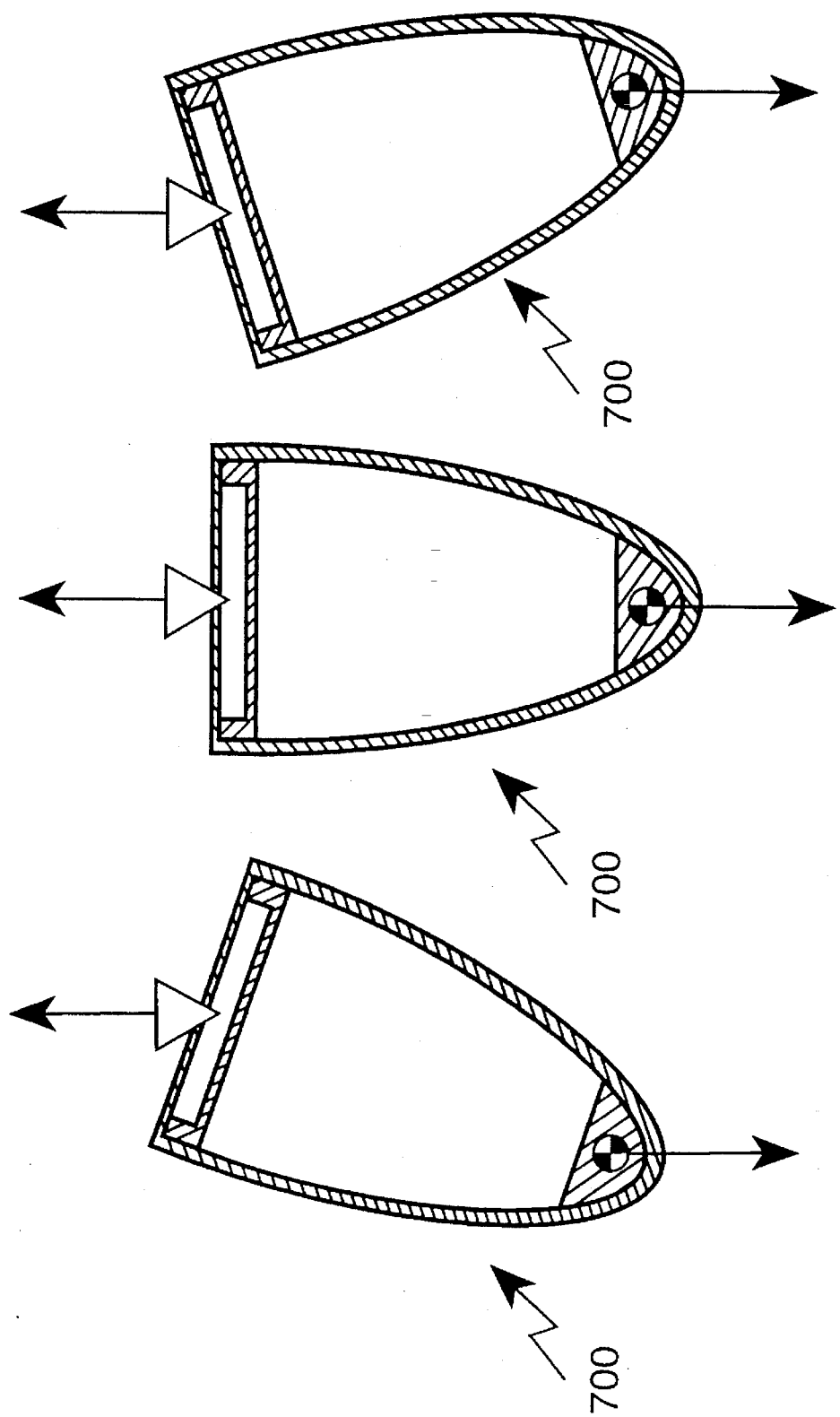
FIG. 7A is a cross-section view of an antenna mount showing the action of a pendular antenna mount in response to vehicle motion without the action of the dampening fluid.
FIG. 7B is a cross-section view of an antenna mount showing the action of a pendular antenna mount in response to vehicle motion without the action of the dampening fluid, showing the mount passing through the point of equilibrium.
FIG. 7C is a cross-section view of an antenna mount showing the action of a pendular antenna mount in response to vehicle motion without the action of the dampening fluid showing induced oscillation.

FIGS. 7A–C shows a cross-section view of an antenna mount showing the action of a pendular antenna mount in response to vehicle motion without the action of a dampening fluid. For the sake of illustration, the antenna is not shown attached to the antenna mount in FIGS. 7A–C. Further, for the sake of illustration, the mounting yoke and gimbals are not shown.

In FIG. 7A, a shock or force (e.g., wave) has caused the antenna mount to sway from its vertical state of equilibrium, tilting antenna mount 700 to one side. When this force or acceleration is removed, antenna mount 700 swings back through its normal equilibrium state as shown in FIG. 7B. However, since antenna mount 700 is not provided with a dampening fluid, the antenna mount now oscillates through its equilibrium position like a pendulum, as shown in FIG. 7C.

The characteristics of a pendulum are well known in the art. The period of a pendulum can be determined by the following equation:

$$T = 2\pi \sqrt{L/G}$$

Where L is the length of the pendulum, G equals the gravitational constant (32 feet/sec$^2$). As discussed below in connection with FIGS. 8A–C, the pendular motion can be dampened by allowing L to be variable outside of the equilibrium state, such that the antenna mount remains an equilibrium much like the surface of a fluid.

Figure 8:
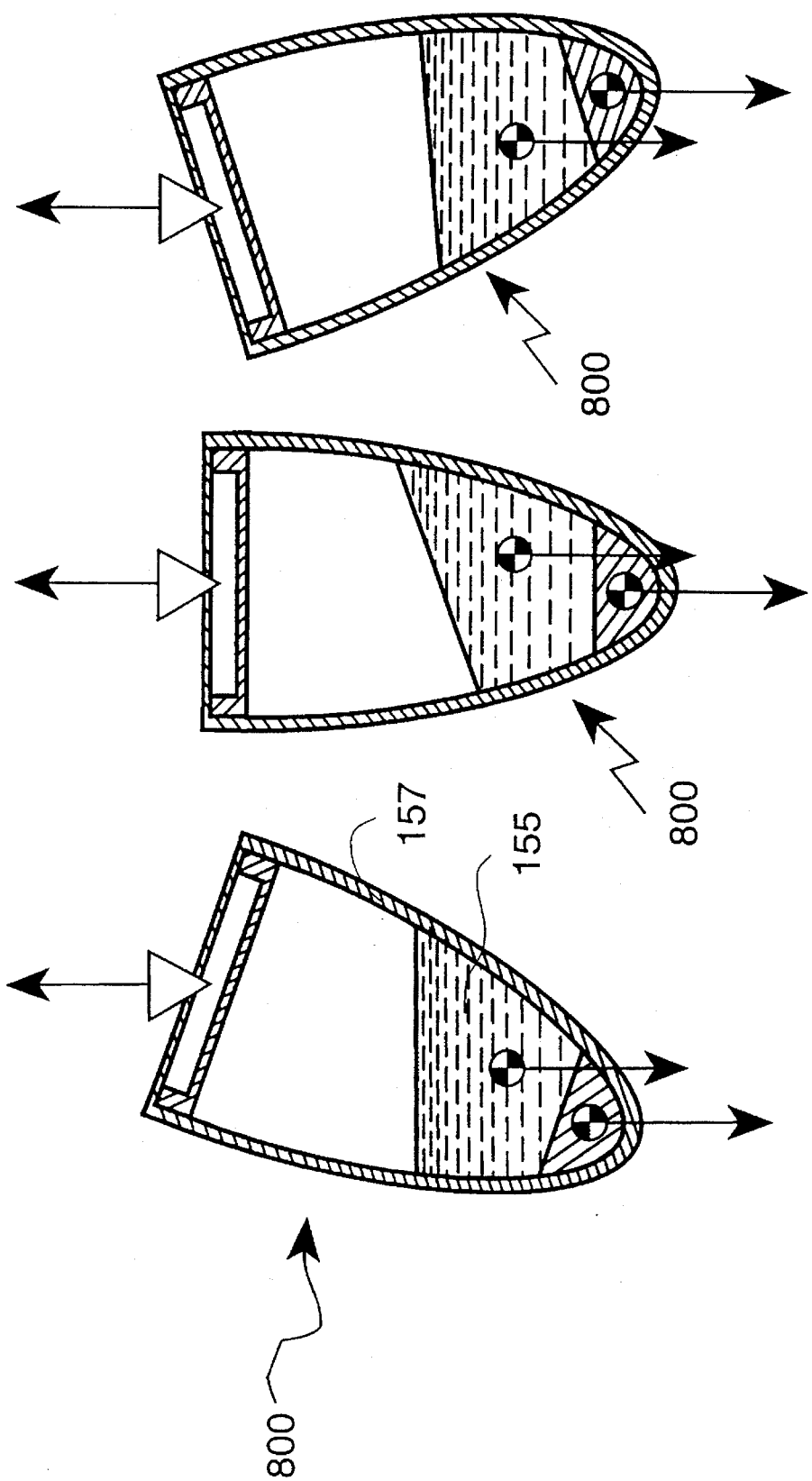
FIG. 8A is a cross-section view of the antenna mount of the present invention, showing the action of the antenna mount in response to vehicle motion with the action of the dampening fluid.
FIG. 8B is a cross-section view of the antenna mount of the present invention, showing the antenna mount passing through the point of equilibrium.
FIG. 8C is a cross-section view of the antenna mount of the present invention, showing the effect of the dampening fluid in response to an induced oscillation.

FIGS. 8A–C show a cross-section view of the antenna mount of the present invention showing the action of the antenna mount in response to vehicle motion with the action of the dampening fluid. For the sake of illustration, the antenna, mounting yoke and gimbals are not shown in FIGS. 8A–C. FIG. 8A shows antenna mount 800 after some shock or force has caused antenna mount 800 to sway from its vertical state of equilibrium. Antenna 800 includes dampening fluid 155. As shown in FIG. 8A, dampening fluid 155 tends to shift in the opposite direction of the shock or force which is caused the antenna mount 800 to sway from its vertical state of equilibrium. Since housing 157 is only partially filled with dampening fluid 155, dampening fluid 155 is free to move back and forth within housing 157. As the dampening fluid 155 has moved, the center of gravity of antenna mount 800 shifts toward the equilibrium position.

FIG. 8B shows antenna mount 800 swinging back through its normal equilibrium state. As can be seen in FIG. 8B, the dampening fluid may be still shifted to one side, and thus the center of gravity counteracts the inertial effect. As shown in FIG. 8C, the antenna mount 800 may swing slightly beyond this point of equilibrium. However, antenna mount 800 has been dampened by the free surface effect of dampening fluid 155.

Figure 6:
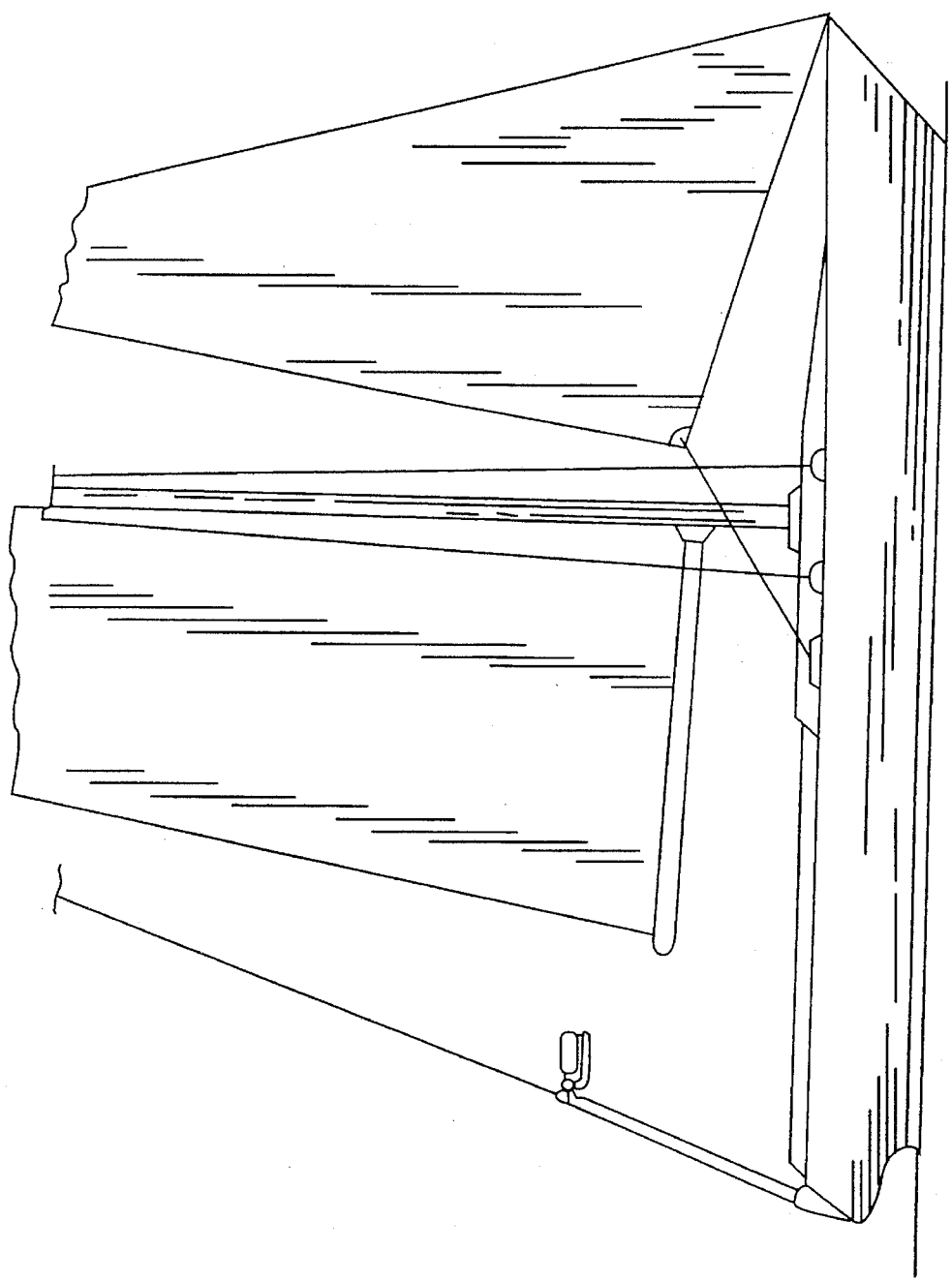
FIG. 6 shows a prior art single-axis pendular antenna mount using viscous dampening.

The antenna mount of the present invention, as shown in FIGS. 8A–C operates due to a phenomenon known as the free-surface effect of a liquid. This effect relies upon the shear force of a volume of liquid reacting with the movement of the container. This action may be altered or tuned by altering the size or shape of the container, such as by adding baffles as shown in FIG. 1B, or by altering the viscosity of the liquid, or by a combination of both. The free-surface effect as used in the present invention, differs from other dampening effects, such as the orifice metering technique used by DeSatnick in FIG. 6, as the motion of the liquid acts to alter the center of gravity of the device and counteract induced oscillations, without unduly dampening response to applied acceleration.

Figure 9:
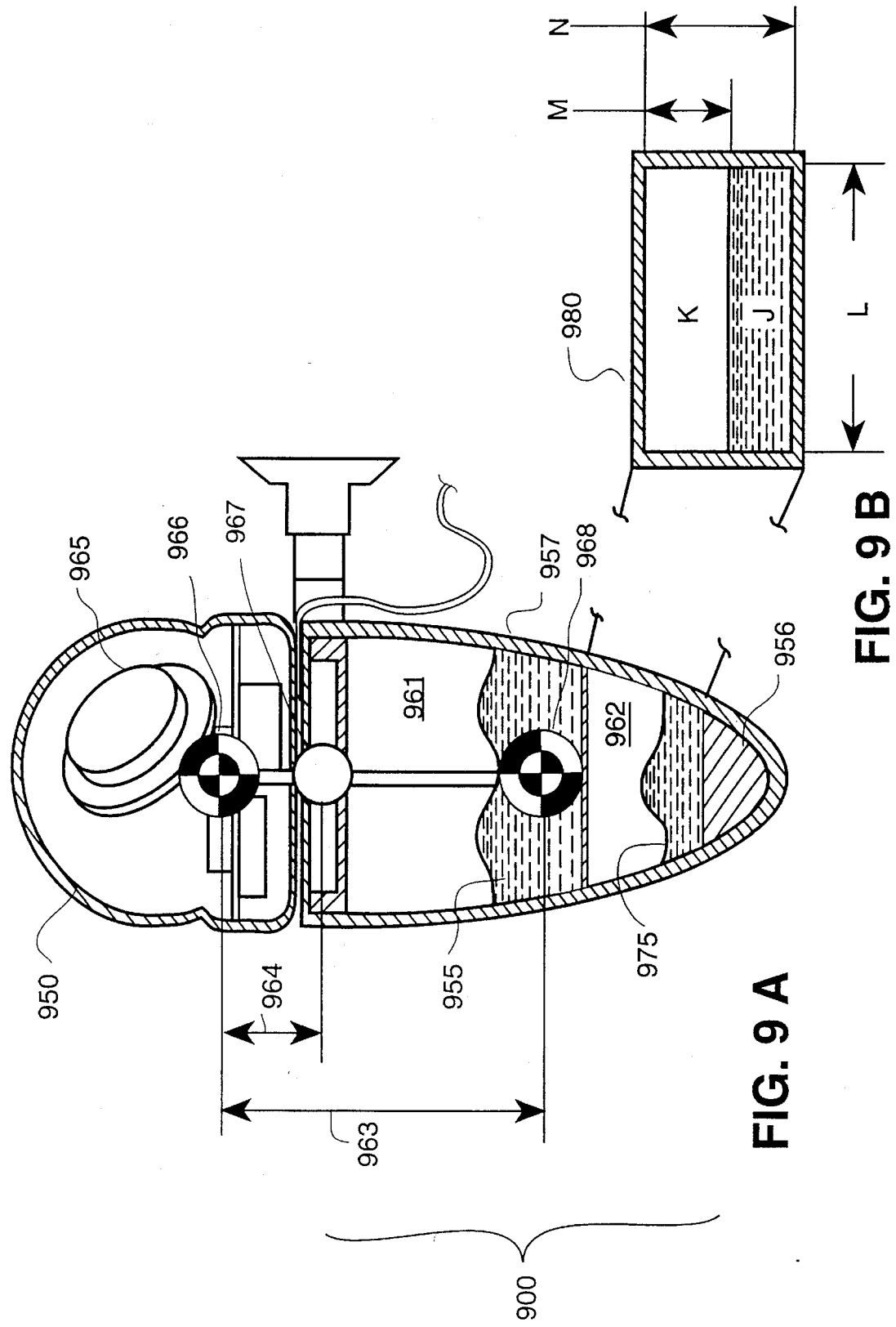
FIG. 9A is a cross-section view of a second embodiment of a marine antenna mount according to the present invention, showing the location of the center of gravity of the antenna and ballast.
FIG. 9B is a cross-section schematic view of the dimensional criteria for the fluid chambers of the marine antenna mount of FIG. 9A.

FIG. 9A shows a cross-section view of a second embodiment of the present invention. In the marine antenna mount of the second embodiment, two separate fluid ballast compartments 961 and 962 are provided in ballast portion 900. For the sake of illustration, the yoke and gimbals are not shown in FIG. 9A. FIG. 9A shows antenna unit 950 containing antenna 965 which may be a directional or omnidirectional, mechanically or electronically steered antenna unit. Antenna 965 has a center of gravity 966. Ballast portion 900, including housing 957, dampening fluids 955 and 975, and weight 956, has a center of gravity 968.

Although in the embodiment of FIG. 9A shows only two fluid ballast compartments 961 and 962, an additional number of fluid ballast compartments may also be used, stacked vertically. These ballast compartments may or may not contain annular baffles 160 shown in FIGS. 1A and 1B.

Dimension 964 represents the distance from Cartesian Z axis fulcrum 967 to center of gravity 966 of antenna unit 965. Dimension 963 represents the distance between the center of gravity 966 of antenna unit 965 and the center of gravity 968 of the ballast portion 900. In the preferred embodiment, dimension 964 may be between 5% and 50% of dimension 963.

As in FIG. 1A, ballast weight 956 may comprise a suitably dense material such as lead. Dampening fluids 955 and 975 preferably comprises a fluid in the viscosity range of 6 to 1000 centipoise, having a specific gravity range of 0.6 to 2.23 grams per centimeter squared. Both the specific gravity and viscosity of dampening fluids 955 and 975 should be relatively constant over a broad temperature range (e.g., –40° C. to 100° C.) or at least remain within the above limits over this temperature range.

FIG. 9B shows a schematic representation of one of the ballast compartments 961 or 962. Although the sides of ballast compartments 961 and 962 are slightly curved, for the purposes of illustration, the compartments are shown in FIG. 9B as having a rectangular cross-section. In addition, ballast compartments 961 and 962 may be provided as series of step-wise cylindrical compartments, or in the alternative, ballast portion 900 may be provided in a cylindrical form, allowing for the formation of ballast compartments 961 and 962 of identical shape and size.

Ballast compartments 961 and 962 are represented in FIG. 9B schematically as ballast compartment 980. Ballast compartment 980 has a length L and depth N. The ballast compartment contains a dampening fluid J and a gas K. Dampening fluid J is preferably selected to have the properties discussed above in connection with dampening fluids 955 and 975. Gas K, is preferably an inert gas which is relatively stable over a broad temperature range (e.g., –40° C. to 100° C.) and is non-reactive with fluid J. Dimension M represents the difference between the depth N of ballast tank 980 and the depth of fluid J. Since ballast compartment 980 is cylindrical, the ratio between M and N also represents the ratio between the volume of gas K and the overall volume of ballast compartment 980. In the preferred embodiment, dimension M should be 20 to 80 percent of dimension N. In the preferred embodiment the ratio between depth N and length L should be in the ratio range between 1:5 and 5:1. If multiple ballast compartments are used, it should be noted that the above ratios may be different for each compartment, in order to fine tune the dampening effect. The tuning of the dampening effect may be further augmented by the use of additional mechanical or hydromechanical shock absorbing elements attached to gimbal mounts 153, 154.

Figure 10:
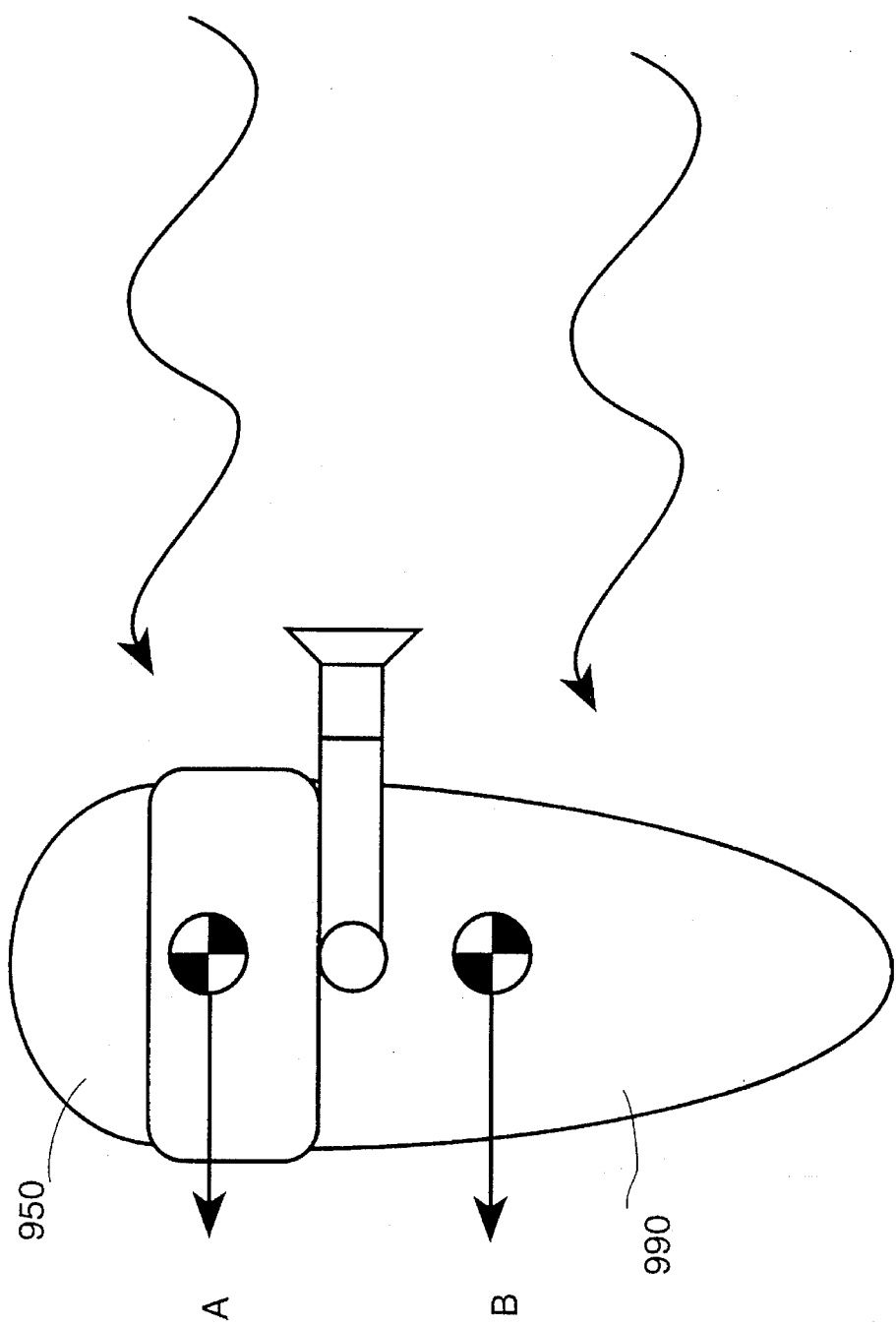
FIG. 10 is a plan view of the marine antenna mount of the present invention showing the effect of wind loading on the mount.

FIG. 10 is a plan view of the marine antenna mount of the present invention showing the effect of wind loading. Wind forces acting on the marine antenna shown in FIG. 10 are shown as two forces A and B acting on the respective center of gravities of the antenna unit 950 and the ballast assembly 990. In the preferred embodiment, the sum of the moments created by wind forces A and B should be 0 over the wind velocity range of 0 to 120 miles per hour. Wind tabs may be added to the design in order to establish this balance.

In the preferred embodiment, the entire antenna mount and radome are approximately eighteen inches in length, with a diameter of approximately six inches. The relatively small size of the antenna mount of the present invention minimizes associated wind drag and presents an aesthetically pleasing appearance. The relatively small size makes the design particularly applicable for small craft.

Figure 11:
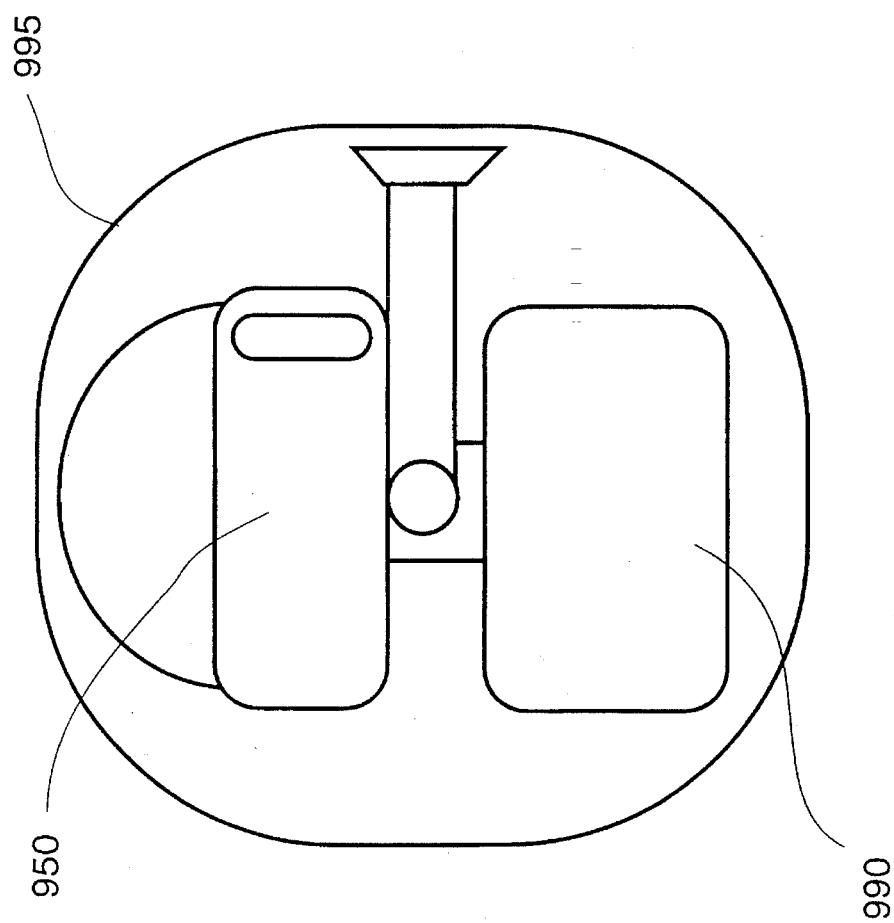
FIG. 11 is a plan view of a third embodiment of the present invention.

FIG. 11 shows an alternative third embodiment of the present invention using external radome 995 covering both antenna unit 950 and ballast assembly 990. Radome 995 is large enough to encompass all of antenna unit 950 and ballast assembly 990 and allow freedom of movement in all two axes. Since wind loading in this embodiment is only a factor with regard to external radome 995, the shape of ballast assembly 990 and antenna unit 950 may be suitably altered to any shape which fits within radome 995.

The antenna mount of the present invention compensates for pitch and roll movements due to changes in vehicle direction or attitude. The antenna mount of the present invention has particular application for reception of voice and data signals (e.g., weather reports) from satellite. Such a system may utilize so-called "L" band signals (e.g., 1500–1600 MHz) from relatively high power satellites (e.g., 100 Watts or more). Thus, such a system may not require the directionality of more traditional satellite communications systems (e.g., TVRO C-Band, Ku-Band, or the like), allowing the antenna to receive signals from as much as 5° off-axis. Thus, the antenna mount of the present invention may provide sufficient stability to maintain satellite reception under such criteria.

Figure 12:
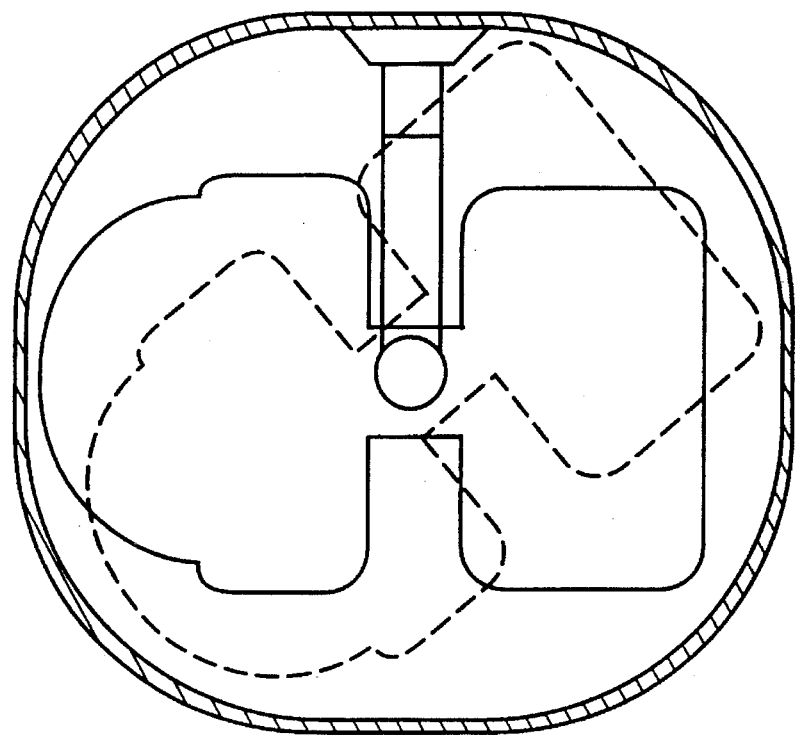
FIG. 12 is a cross-section view of the third embodiment of the present invention.

It should be noted that although the antenna mount of the present invention has been described in connection with marine applications, the antenna mount of the present invention may also be adapted for other uses. For example, the antenna mount of the present invention may be adapted to land vehicles to provide additional motion compensation for sudden turns or changes in direction, such as for off-road vehicles (e.g., ATV, 4×4, or the like). The antenna mount may be readily adapted for omnidirectional antennas, such as GPS receiver antennas, used for navigation (e.g., location, movable map, or the like). The antenna mount of the present invention, particular the enclosed radome embodiment of FIGS. 11 and 12, may be used in aviation applications, for example, for satellite communications.

It will be readily seen by one of ordinary skill in the art that the present invention fulfills all of the objects set forth above. In particular, the antenna mount of the present invention suitable compensates and dampens sudden vehicle movements, allowing a relatively omnidirectional, beam steered, or mechanically steered antenna to maintain radio communications with another radio source, particularly a satellite.

After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. An antenna mount for mounting an antenna to a surface, comprising:

a ballast housing supporting the antenna and including a dampener disposed in a lower area of said ballast housing dampening oscillations of said ballast housing induced by an external force;

a first gimbal, coupled to said ballast housing, and allowing at least one of said ballast housing and the antenna mount to rotate with respect to one of pitch and roll;

a yoke, coupled to said first gimbal;

a second gimbal, coupled to said yoke, and allowing at least one of said yoke and the antenna mount to rotate with respect to another of pitch and roll;

a mounting bracket, coupled to said second gimbal and to the surface, and rotating relative to said ballast housing with respect to pitch and roll; and a radome substantially enclosing the antenna and coupled to at least one of said ballast housing, said yoke and said mounting bracket.

2. The antenna mount of claim 1, wherein said dampener comprises:

at least one sealed chamber; and a dampening fluid contained in said at least one sealed chamber.

3. The antenna mount of claim 2, wherein said at least one sealed chamber further contains a gas.

4. The antenna mount of claim 3, wherein the volume of the gas in the sealed chamber is 20 to 80 percent of the volume of said at least one sealed chamber.

5. The antenna mount of claim 2, wherein said at least one sealed chamber has a depth N and length L, and the ratio between the depth N and length L is between 1:5 and 5:1.

6. The antenna mount of claim 1, wherein said ballast housing comprises a lead weight.

7. The antenna mount of claim 2, wherein said dampening fluid comprises a fluid in the viscosity range of 6 to 1000 centipoise.

8. The antenna mount of claim 2, wherein said dampening fluid has a specific gravity range of 0.6 to 2.23 grams per centimeter squared.

9. The antenna mount of claim 2, wherein the specific gravity and viscosity of said dampening fluid is substantially constant over a temperature range of −40° C. to 100° C.

10. The antenna mount of claim 2, wherein said at least one sealed chamber is substantially cylindrical and further includes annular baffles.

11. The antenna mount according to claim 1, wherein at least one of said first and second gimbals further comprises:

shock absorbing means, for dampening movement of said at least one of said first and second gimbals.

12. The antenna mount according to claim 11, wherein said shock absorbing means comprises at least one pneumatic dampening device mounted to at least one of said first and second gimbals, for dampening movement along at least one rotational axis of said at least one of said first and second gimbals.

13. The antenna mount of claim 1, wherein said dampener generates a free surface affect to dampen movement of the antenna when subjected to externally applied acceleration, minimizing the oscillations of the antenna and positioning the antenna substantially normal with respect to the curvature of earth.

14. The antenna mount of claim 1, wherein said ballast housing comprises a substantially hollow and cone-shaped housing, and said dampener being disposed in the lower area of said cone-shaped housing.

15. The antenna mount of claim 14, wherein said substantially hollow and cone-shaped housing is substantially vertical with respect to the curvature of earth.

16. The antenna mount of claim 15, wherein said dampener comprises a dampening fluid disposed in a lower area of said substantially hollow and cone-shaped housing, and wherein said dampening fluid is contained in said substantially hollow and cone-shaped housing with sufficient depth to create a free-surface effect.

17. An antenna mount for mounting an antenna to a surface, comprising:

a ballast housing and radome enclosure substantially enclosing the antenna and including a dampener disposed in a lower area of said ballast housing dampening oscillations of said ballast housing induced by an external force;

a first gimbal, coupled to said ballast housing, and allowing at least one of said ballast housing and the antenna mount to rotate with respect to a first rotational axis;

a yoke, coupled to said first gimbal;

a second gimbal, coupled to said yoke, and allowing at least one of said yoke and the antenna mount to rotate with respect to a second rotational axis; and a mounting bracket, coupled to said second gimbal and to the surface, and rotating relative to said ballast housing with respect to the first rotational axis and the second rotational axis.

18. An antenna mount according to claim 17, wherein said dampener comprises:

at least one sealed chamber; and a dampening fluid contained in said at least one sealed chamber, said dampening fluid comprising a fluid in the viscosity range of 6 to 1000 centipoise, and having a specific gravity range of 0.6 to 2.23 grams per centimeter squared, and a gas contained in said at least one sealed chamber, wherein the volume of the gas in the sealed chamber is 20 to 80 percent of the volume of said at least one sealed chamber, and said at least one sealed chamber has a depth N and length L, and the ratio between the depth N and length L is between 1:5 and 5:1.

19. The antenna mount according to claim 17, wherein at least one of said first and second gimbals further comprises:

shock absorbing means, for dampening movement of said at least one of said first and second gimbals.

20. The antenna mount according to claim 19, wherein said shock absorbing means comprises at least one pneumatic dampening device mounted to said at least one of said first and second gimbals, for dampening movement along at least one rotational axis of said at least one of said first and second gimbals.

21. The antenna mount of claim 17, wherein said dampener comprises at least one sealed chamber which is substantially cylindrical and further includes annular baffles providing additional surface area in said ballast housing to interact with said dampening fluid.

22. The antenna mount according to claim 17, further comprising a shock absorber connected to said ballast housing and to a one of the antenna mount and the surface, said shock absorber dampening movement of said two-axis ballast housing.

23. The antenna mount of claim 17, wherein said dampener comprises:

at least one sealed chamber; and a dampening fluid contained in said at least one sealed chamber.

24. The antenna mount of claim 23, wherein said at least one sealed chamber comprises two sealed chambers, and wherein said dampening fluid is contained in said two sealed chambers, further dampening the oscillations of the antenna mount.

25. The antenna mount of claim 17, wherein said dampener generates a free surface affect to dampen movement of the antenna when subjected to the external force, minimizing the oscillations of the antenna and positioning the antenna substantially normal with respect to the curvature of earth.

26. An antenna mount for mounting an antenna to a surface, comprising:

ballast means for supporting the antenna, said ballast means including a dampener disposed in a lower area of said ballast means dampening oscillations of said ballast means induced by an external force;

first gimbal means for allowing at least one of said ballast means and the antenna mount to rotate with respect to one of pitch and roll;

a yoke, coupled to said first gimbal means;

second gimbal means, coupled to said yoke, and allowing at least one of said yoke and the antenna mount to rotate with respect to another of pitch and roll;

a mounting bracket, coupled to said second gimbal means and to the surface, and rotating relative to said ballast means with respect to pitch and roll; and a shock absorber connected to said ballast means and to a one of the antenna mount and the surface, said shock absorber dampening movement of said first and second gimbal means.

* * * * *